United States Patent [19]

Howe

[11] 3,751,682

[45] Aug. 7, 1973

[54] PULSED VOLTAGE DRIVER FOR CAPACITIVE LOAD

[75] Inventor: James A. Howe, Burnsville, Minn.

[73] Assignee: Sperry Rand Corporation, New York, N.Y.

[22] Filed: Dec. 17, 1971

[21] Appl. No.: 209,465

[52] U.S. Cl. .............. 307/255, 307/247 A, 307/262, 307/270, 307/313

[51] Int. Cl. .............. H03k 17/00

[58] Field of Search .............. 307/255, 262, 270, 307/247 A, 313

[56] References Cited

UNITED STATES PATENTS

| | | | |
|---|---|---|---|
| 3,649,851 | 3/1972 | Cohen | 307/270 |
| 2,930,942 | 3/1960 | Levine et al. | 317/148.5 |
| 3,157,797 | 11/1964 | Eshelman | 307/255 |
| 3,591,858 | 7/1971 | Boyd et al. | 307/255 |
| 3,160,766 | 12/1964 | Reymond | 307/255 |
| 3,155,963 | 11/1964 | Boensel | 307/255 X |
| 3,125,694 | 3/1964 | Palthe | 307/263 X |
| 2,997,606 | 8/1961 | Hamburger et al. | 307/255 X |

*Primary Examiner*—Stanley D. Miller, Jr.

*Attorney*—Kenneth T. Grace, Thomas J. Nikolai and Donald W. Phillion

[57] ABSTRACT

A voltage source of pulsed signals for charging or discharging a capacitive load is disclosed. The circuit includes two complementary transistors serially coupled along their output (collector and emitter) electrodes between the two voltage sources as a push-pull driver. Their input (base) electrodes are each coupled in parallel by a respectively associated serially aligned capacitor and resistor to an input terminal that is driven by a binary logic level circuit while their common coupled output (collector) electrodes are coupled to a capacitive load.

13 Claims, 7 Drawing Figures

PULSED VOLTAGE DRIVER FOR CAPACITIVE LOAD

BACKGROUND OF THE INVENTION

The present invention is directed toward electronic circuits designed to couple pulse-like voltage signals to the memory array of data processing systems wherein the capacitive load associated with the memory array drive lines is properly charged or discharged. A typical prior-art electronic circuit for such function is that of the J. R. Brown, Jr. U.S. Pat. No. 3,423,603. The present invention is an improvement over such prior-art devices providing high-speed short time-constant rise and fall time driving pulses while having low-power requirements.

BRIEF SUMMARY OF THE INVENTION

The present invention involves a means for generating pulse-like voltage signals for driving a capacitive load, such as precharging or discharging a drive line of a magnetizable memory array, under control of a binary-logic-level input signal; or driving a semiconductor memory. The voltage driver is composed of two complementary three-electrode transistors that are serially coupled along their output (collector and emitter) electrodes between two voltage sources. The input (base) electrodes are coupled in parallel to the input signal at an input terminal by a serially coupled resistor and capacitor while their common coupled output (collector) electrodes are coupled to an output terminal from which the output voltage pulses are coupled to the capacitive load.

DESCRIPTION OF THE PREFERRED EMBODIMENTS

Figures 1, 2:
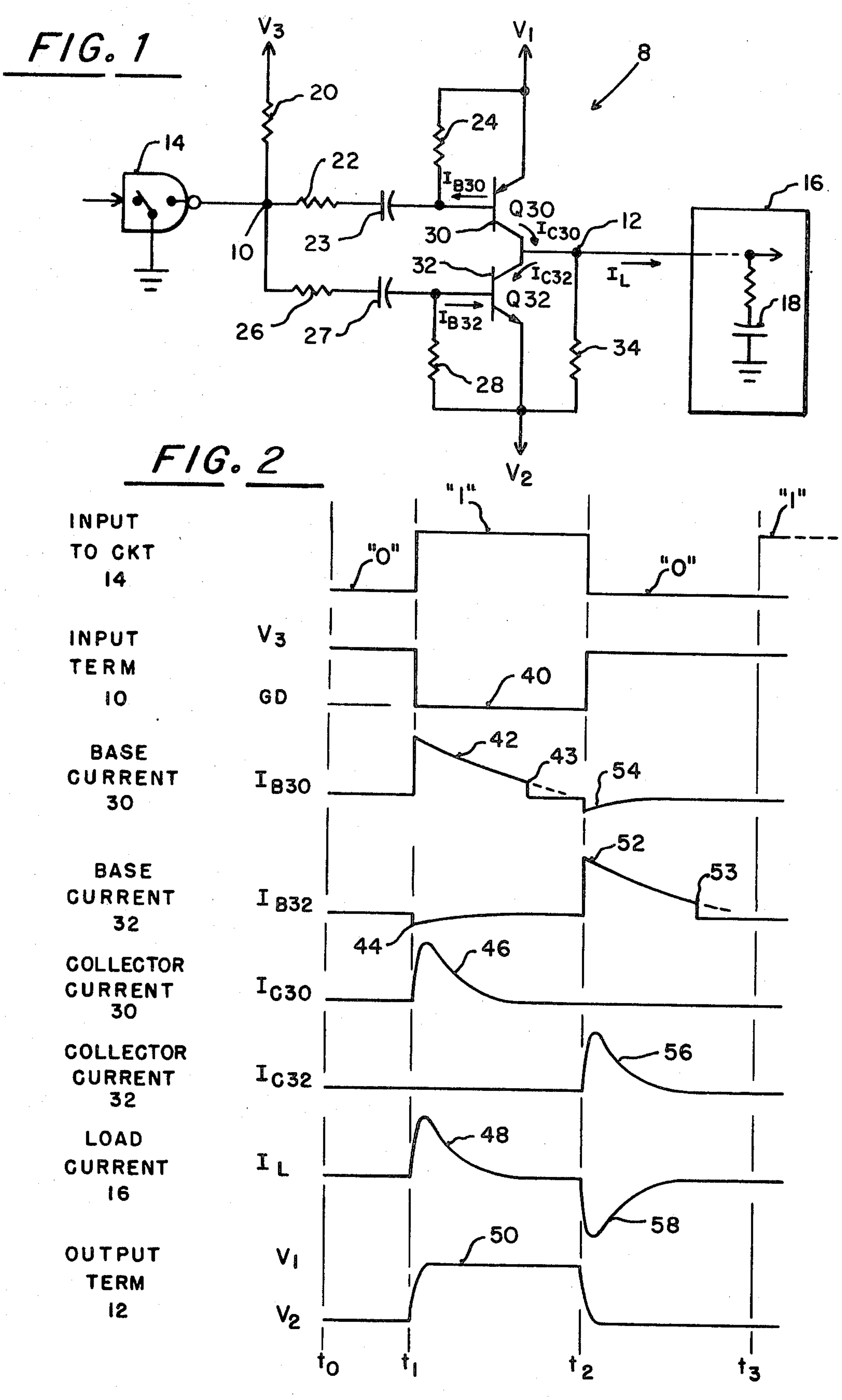
FIG. 1 is a circuit schematic of a first preferred embodiment of the present invention.
FIG. 2 is a timing diagram of the operation of the driver of FIG. 1.

With particular reference to FIG. 1 there is presented a circuit schematic of a first preferred embodiment of the present invention in which the output signal level at output terminal 12 substantially follows the input signal level at input terminal 10 as determined by the binary logic input circuit 14. Input circuit 14 functions as a single-pole switch coupling input terminal 10 to ground when it has a logical 0 input or open circuiting its coupling to input terminal 10 when it has a logical 1 input. Output terminal 12 is normally at a relative low potential (approximately V2) when the coupling from input circuit 14 to input terminal 10 is open-circuited and is triggered into a relatively high potential (approximately V1) when the coupling from input circuit 14 to input terminal 10 is grounded. Output terminal 12 is, in turn, coupled to a capacitive load 16 for charging or discharging the load capacitances 18.

With particular reference to FIG. 2 there are presented the idealized signal wave forms associated with the operation of the driver of FIG. 1. Input circuit 14 is normally deactivated, as at time $t_0$, by a relatively low input potential logical 0 permitting pull-up resistor 20 to couple the positive voltage source V3 to input terminal 10. No DC current will flow through coupling capacitors 23 and 27, causing both transistors 30 and 32 to be normally nonconductive or OFF while resistor 34 maintains output terminal 12 at the relatively low potential level of voltage source V2. If at a subsequent time $t_1$ a relatively high input potential logical 1 activates input circuit 14 it couples its connection at input terminal 10 to a source of ground potential pulse 40. The resistor 22, capacitor 23, resistor 24 and the resistor 26, capacitor 27, resistor 28 differentiating circuits couple the sharp fall time leading edge of pulse 40 to the base drive circuitry of transistor 30 and transistor 32, respectively. Transistor 30 is turned ON by the forward biasing of the base-emitter junction of transistor 30 causing the base current pulse 42 to flow through the base electrodes of transistor 30. Transistor 32 is kept turned OFF by the further reverse biasing of the base-emitter junction of transistor 32 causing the base current pulse 44 to flow through the base electrode of transistor 32. The base drive time constant of transistor 30 of $$R_{eff} \times C_{23}$$

is selected so that the base drive of transistor 30 will, prior to time $t_2$ as at point 43, again fall to its normally low level to again turn transistor 30 OFF. However, when transistor 30 is initially turned ON as at time $t_1$ with transistor 32 OFF the signal level at output terminal 12 is driven to approximately V1 generating the transistor 30 collector current pulse 46 and resulting load current pulse 48. The RC load 16 at output terminal 12 is such that over the period $t_1 - t_2$ the output signal is substantially a rectangular pulse 50 of total amplitude (V1–V2) and time duration $t_1 - t_2$.

If then at time $t_2$, with both transistor 30 and transistor 32 OFF, input circuit 14 is again deactivated by a relatively low input potential logical 0 it decouples its connection at input terminal 10 from the source of ground potential pulse 40 permitting pull-up resistor 20 to again couple the positive voltage source V3 to input terminal 10. The resistor 22, capacitor 23, resistor 24 and the resistor 26, capacitor 27, resistor 28 differentiating circuits couple the sharp rise time trailing edge of pulse 40 to the base drive circuitry of transistor 30 and transistor 32, respectively. Transistor 32 is turned ON by the forward biasing of the base-emitter junction of transistor 32 causing the base current pulse 52 to flow through the base electrode of transistor 32. Transistor 30 is kept turned OFF by the further reverse biasing of the base-emitter junction of transistor 30 causing the base current pulse 54 to flow through the base electrode of transistor 30. The base drive time constant of transistor 32 of $$R_{eff} \times C_{27}$$

is selected so that the base drive of transistor 30 will, prior to time $t_3$, as at point 53 which is prior to the time of the coupling of the next logical 1 to input circuit 14, again fall to its normally low level to again turn transistor 32 OFF. However, when transistor 32 is initially turned ON, as at time $t_2$, with transistor 30 OFF the signal level at output terminal 12 is driven to approximately V2 generating the transistor 32 collector current pulse 56 and the resulting load current pulse 58. The internal circuit RC time constants are selected such that over the period $t_2 - t_3$ both transistor 30 and transistor 32 are turned OFF prior to the initiation of the next pulse generating cycle as at time $t_3$.

Figures 3, 4:
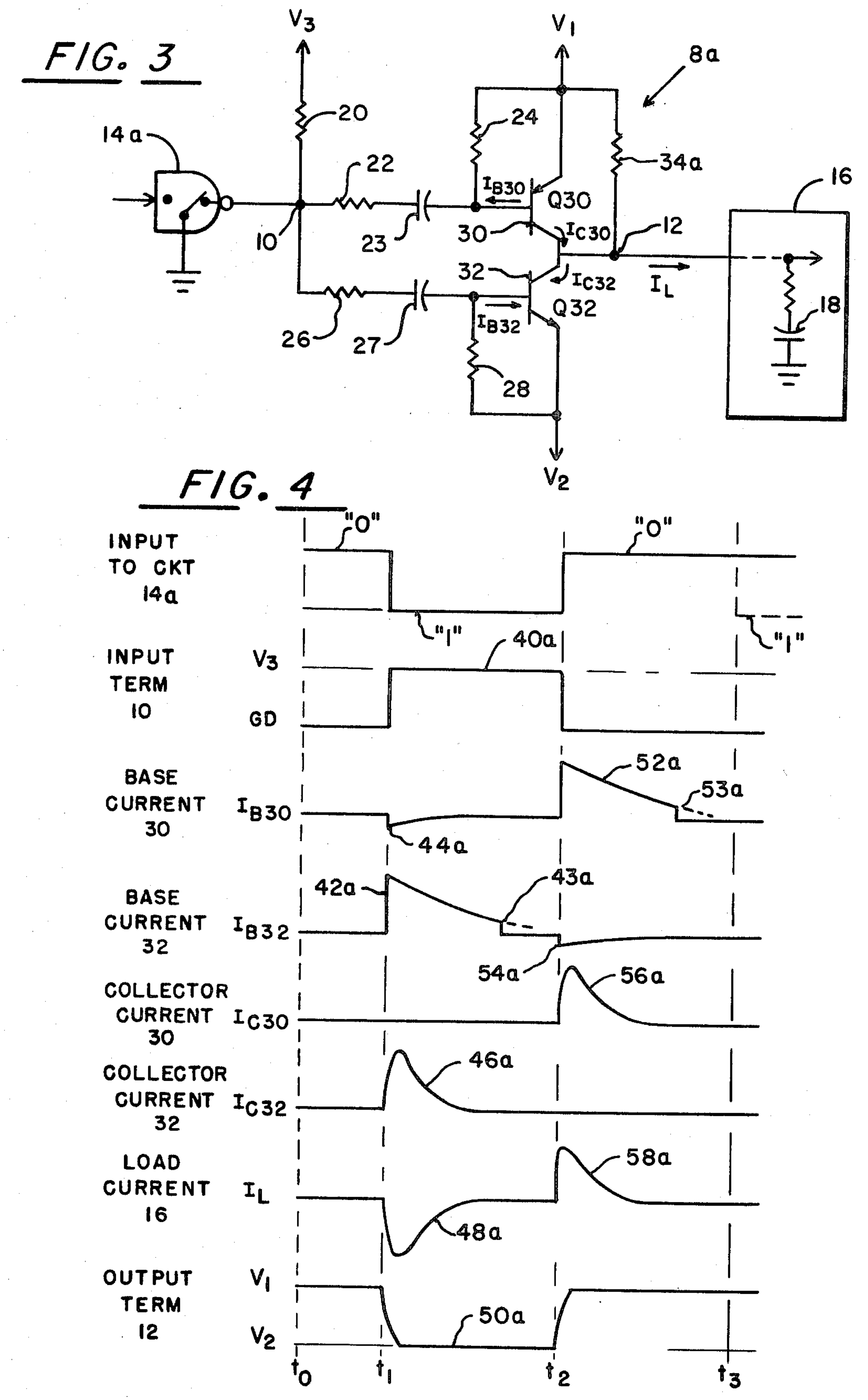
FIG. 3 is a circuit schematic of a second preferred embodiment of the present invention.
FIG. 4 is a timing diagram of the operation of the driver of FIG. 3.

With particular reference to FIG. 3 there is presented a circuit schematic of a second preferred embodiment of the present invention in which like components of FIG. 1 are denoted by like referenced numbers and in which the output signal level at output terminal 12 substantially follows the input signal level at input terminal 10 as determined by binary logic input circuit 14a. Output terminal 12 is normally at a relatively high potential (approximately V1) when the coupling from input circuit 14*a* to input terminal 10 is open-circuited. This drive of FIG. 3 is substantially similar to the driver of FIG. 1 except that in FIG. 3 the resistor 34*a* is coupled across the collector-emitter junction of transistor 30 while in FIG. 1 the resistor 34 is coupled across the collector-emitter junction of transistor junction 32.

Input circuit 14a is normally activated as at time $t_0$ by a relatively high input potential logical 0 coupling its connection at input terminal 10 to a source of ground potential pulse 40*a*. No DC current will flow through coupling capacitors 23 and 27, causing both transistors 30 and 32 to be normally nonconductive or OFF while resistor 34*a* maintains output terminal 12 at the relatively high potential level of voltage source V1. If at time $t_1$ a relatively low input potential logical 1 deactivates input circuit 14 it decouples its connection at input terminal 10 permitting pull-up resistor 20 to couple the positive voltage source V3 to input terminal 10. The resistor 22, capacitor 23, resistor 24 and the resistor 26, capacitor 27, resistor 28 differentiating circuits couple the sharp rise time leading edge of pulse 40*a* to the base drive circuitry of transistor 30 and transistor 32, respectively. Transistor 32 is turned ON by the forward biasing of the base-emitter junction of transistor 32 causing the positive base current pulse 42*a* to flow through the base electrode of transistor 32. Transistor 30 is kept turned OFF by the further reverse biasing of the base-emitter junction of transistor 30 causing the base current pulse 44*a* to flow through the base electrode of transistor 30. The base drive time constant of transistor 32 of $$R_{eff} \times C_{27}$$

is selected so that the base drive of transistor 32 will, prior to time $t_2$, as at point 43*a*, again fall to its normally low level to again turn transistor 32 OFF. However, when transistor 32 is initially turned ON as at time $t_1$ with transistor 30 OFF the signal level at output terminal 12 is driven to approximately V2 generating the transistor 32 collector current pulse 46*a* and the resulting load current pulse 48*a*. The RC load 16 at output terminal 12 is such that over the period $t_1 - t_2$ the output signal is substantially a rectangular pulse 50*a* of total amplitude (V1–V2) and time duration $t_1 - t_2$.

If then at time $t_2$, with both transistors 30 and 32 OFF, input circuit 14*a* is again activated by a relatively high input potential logical 0 it couples its connection at input terminal 10 to a source of ground potential. The resistor 22, capacitor 23, resistor 24 and the resistor 26, capacitor 27, resistor 28 differentiating circuits couple the sharp fall time trailing edge of pulse 40*a* to the base drive circuitry of transistor 30 and transistor 32, respectively. Transistor 30 is turned ON by the forward biasing of the base-emitter junction of transistor 30 causing a base current pulse 52*a* to flow through the base electrode of transistor 30. Transistor 32 is kept turned OFF by the further reverse biasing of the base-emitter junction of transistor 32 causing the base current pulse 54*a* to flow through the base electrode of transistor 32. The base drive time constant of transistor 30 of $$R_{eff} \times C_{23}$$

is selected so that the base drive of transistor 30 will, prior to time $t_3$, as at point 54*a* which is prior to the time of the coupling of the next logical 1 to input circuit 14*a*, again fall to its normally low level to again turn transistor 30 OFF. However, when transistor 30 is initially turned ON as at time $t_2$ with transistor 32 OFF the signal level at output terminal 12 is driven to approximately V1 generating the transistor 30 collector current pulse 56*a* and the resulting load current pulse 58*a*. The internal circuit RC time constants are selected such that during the time period $t_2 - t_3$ both transistor 30 and transistor 32 are turned OFF prior to the initiation of the next cycle at time $t_3$.

Figure 5:
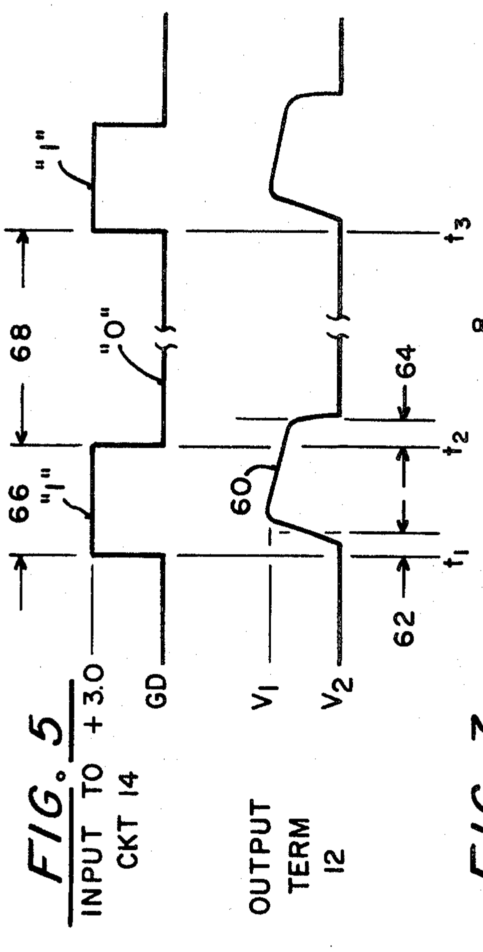
FIG. 5 is an illustration of the more actual signal timing and waveforms of the logic pulse input and the resulting output pulse for the driver of FIGS. 1 and 2.

With particular reference to FIG. 5 there are presented the more actual signal timing and wave form relationships of the logic pulse input to circuit 14 and the resulting output pulse at load 16 for the driver of FIGS. 1 and 2—the equivalent wave forms for the driver of FIGS. 3 and 4 would be of opposite polarity. These wave forms illustrate that the output pulse 60 is not the idealized form of FIG. 2 but does have an ON time delay 62 and an OFF time delay 64 that are the sum of logic 14 delay and transistor turn-on delay and does have a sloping top of maximum signal level of approximately V1. With respect to the logic pulse input to circuit 14, the relatively high potential logic 1 pulse duration or length 66 is constrained to the following limits:

MINIMUM—recovery of capacitor 27;

MAXIMUM—the time constant (resistor 34) capacitor 18; while the separation 68 between two consecutive logic 1 pulses is constrained to the following limits:

MINIMUM—the recovery of capacitor 23.

Figure 6:
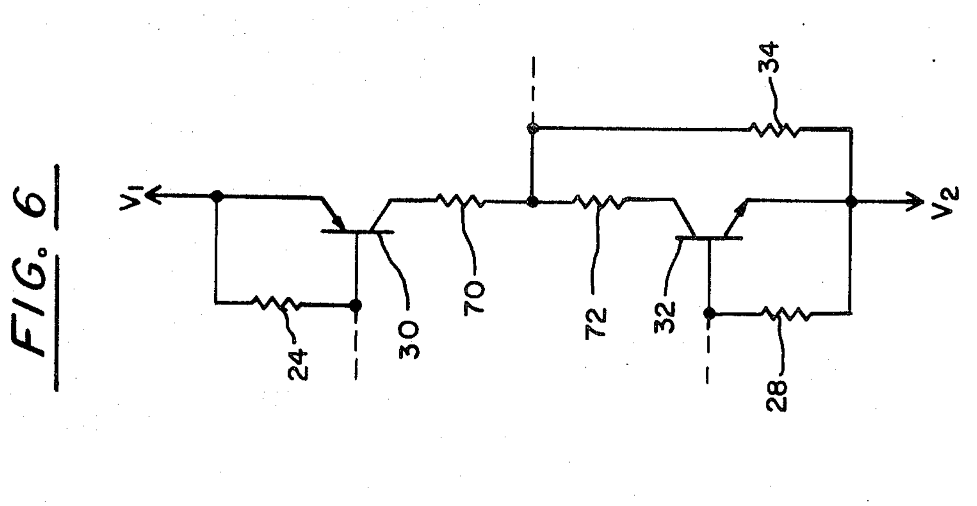
FIG. 6 is a circuit schematic of a third preferred embodiment of the present invention.

With particular reference to FIG. 6 there is presented an illustration of a third embodiment of the present invention. This embodiment consists of the addition of resistor 70 and a resistor 72 to the otherwise directly coupled (the term directly coupled means that there are no discrete circuit components such as a resistor, capacitor or inductor in the coupling means) collector electrodes of the drivers of FIGS. 1 and 2 or of FIGS. 3 and 4. These additional resistors may be included in the common coupled collectors of transistor 30 and transistor 32 where a large voltage difference between voltage sources V1 and V2 is utilized so as to limit the maximum collector current level. Further, one or both of such resistors may be utilized if it is not otherwise possible for one transistor, e.g., transistor 30, to completely turn OFF before the other transistor, e.g., transistor 32, turns ON.

Figure 7:
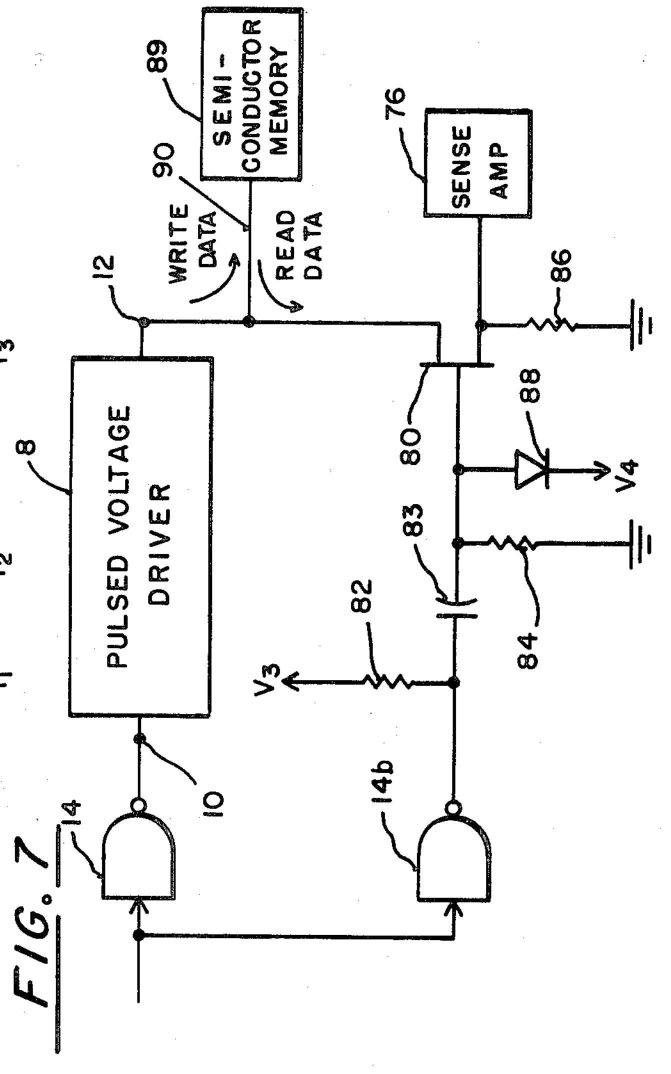
FIG. 7 is an illustration of one application of the driver of FIGS. 1 and 2.

With particular reference to FIG. 7 there is presented an illustration of one application of the driver 8 of FIGS. 1 and 2 driving a semiconductor memory 89. In this configuration driver 8 is utilized to drive the semiconductor memory 89 having common digit-sense line circuitry 90 that requires a 20.0 volt drive signal level (V1) and that provides a 0.50 milliampere output sense signal level. In this configuration FET transistor 80 is normally biased ON eliminating the need for and replacing resistor 34 of driver 8, through the biasing circuitry of resistor 84, diode 88 and voltage V4. Voltage source V3 is the same as in driver 8. When the input to circuit 14 is switched to a relatively high input potential logical 1 as in time $t_1$ (of FIG. 2) the signal level at output terminal 12 rises to the voltage level V1 while capacitor 83 concurrently couples a negative signal to the gate of FET 80 turning FET 80 OFF and isolating the sense amplifier 76 from the 20.0 volt swing at output terminal 12 (FET 80 circuitry having a lesser time delay than delay 62 of FIG. 5) When at time $t_2$ the input to circuit 14 switches back to a relatively low input potential logical 1 the FET 80 is again turned ON coupling sense circuitry 76 to the semiconductor memory 89 at output terminal 12. Diode 88 serves to recover capacitor 83 after termination of the operating cycle.

What is claimed is:

1. A capacitively loaded voltage driver, comprising:
first and second complementary transistors, each having collector, emitter and base electrodes;
first means for intercoupling the collector electrodes of said first and second transistors for forming an output terminal;
second means for coupling the emitter electrode of said first transistor to a first voltage source;
third means for coupling the emitter electrode of said second transistor to a second voltage source;
fourth means for serially intercoupling a first capacitor means and a first resistor means between an input terminal and the base electrode of said first transistor;
fifth means for serially intercoupling a second capacitor means and a second resistor means between said input terminal and the base electrode of said second transistor;
sixth means for coupling said input terminal to a third voltage source;
third resistor means for intercoupling the base and emitter electrodes of said first transistor;
fourth resistor means for intercoupling the base and emitter electrodes of said second transistor; and,
fifth resistor means for coupling the intercoupled collector electrodes of said first and second transistors to the emitter electrode of said first transistor.

2. The driver of claim 1 wherein said first means includes a sixth resistor means for coupling the collector electrode of said first transistor to said output terminal.

3. The driver of claim 2 wherein said first means includes a seventh resistor means for coupling the collector electrode of said second transistor to said output terminal.

4. The driver of claim 1 wherein said first, second and third means are direct coupling means not including any discrete circuit components.

5. The driver of claim 1 wherein said first means are direct coupling means not including any discrete circuit components.

6. The driver of claim 1 wherein said sixth means includes an eighth resistor.

7. A capacitively loaded voltage driver, comprising:
first and second complementary transistors, each having collector, emitter and base electrodes;
first means for intercoupling the collector electrodes of said first and second transistors for forming an output terminal;
second means for coupling the emitter electrode of said first transistor to a first voltage source;
third means for coupling the emitter electrode of said second transistor to a second voltage source;
fourth means for serially intercoupling a first capacitor means and a first resistor means between an input terminal and the base electrode of said first transistor;
fifth means for serially intercoupling a second capacitor means and a second resistor means between said input terminal and the base electrode of said second transistor;
sixth means for coupling said input terminal to a third voltage source;
third resistor means for intercoupling the base and emitter electrodes of said first transistor;
fourth resistor means for intercoupling the base and emitter electrodes of said second transistor;
input circuit means coupled to said input terminal for normally coupling thereto a first input signal of a constant potential level and alternatively coupling thereto a second input signal of a constant potential level different than that of said first input signal and having relatively sharp leading and trailing edges and a given duration;
said first and second capacitor means blocking DC current flow from said third voltage source to the base electrodes of said first and second transistors, respectively, for causing said first and second transistors to be normally held OFF;
said second input signal leading edge being capacitively coupled to the bases of said first and second transistors by said first and second capacitors, respectively, for holding said second transistor OFF and turning said first transistor ON for a time less than the duration of said second input signal;
said second input signal trailing edge being capacitively coupled to the bases of said first and second transistors by said first and second capacitors, respectively, for holding said first transistor OFF and turning said second transistor ON for a time less than the duration between successive ones of said input signal.

8. The driver of claim 8 further including a fifth resistor means for coupling the intercoupled collector electrodes of said first and second transistors to the emitter electrode of said first transistor.

9. The driver of claim 9 wherein said first means includes a sixth resistor means for coupling the collector electrode of said first transistor to said output terminal.

10. The driver of claim 10 wherein said first means includes a seventh resistor means for coupling the collector electrode of said second transistor to said output terminal.

11. The driver of claim 8 wherein said first, second and third means are direct coupling means not including any discrete circuit components.

12. The driver of claim 8 wherein said first means are direct coupling means not including any discrete circuit components.

13. The driver of claim 8 wherein said sixth means includes an eighth resistor.

* * * * *

UNITED STATES PATENT OFFICE
CERTIFICATE OF CORRECTION

Patent No. 3,751,682 Dated August 7, 1973

Inventor(s) James A. Howe

It is certified that error appears in the above-identified patent and that said Letters Patent are hereby corrected as shown below:

Claim 8, Column 6, line 49, "The driver of claim 8" should be -- The driver of claim 7 --.

Claim 9, Column 6, line 53, "The driver of claim 9" should be -- The driver of claim 8 --.

Claim 10, Column 6, line 56, "The driver of claim 10" should be -- The driver of claim 9 --.

Claim 11, Column 6, line 60, "The driver of claim 8" should be -- The driver of claim 7 --.

Claim 12, Column 6, line 63, "The driver of claim 8" should be -- The driver of claim 7 --.

Claim 13, Column 6, line 66, "The driver of claim 8" should be -- The driver of claim 7 --.

Signed and sealed this 19th day of March 1974.

(SEAL)
Attest:

EDWARD M. FLETCHER, JR.
Attesting Officer

C. MARSHALL DANN
Commissioner of Patents